(12) United States Patent
Gommers et al.

(10) Patent No.: US 10,537,960 B2
(45) Date of Patent: Jan. 21, 2020

(54) WELD BETWEEN STEEL CORD ENDS, METHOD AND APPARATUS TO IMPLEMENT SUCH WELD

(71) Applicant: NV BEKAERT SA, Zwevegem (BE)

(72) Inventors: Tom Gommers, Ghent (BE); Geert Malfait, Kruishoutem (BE)

(73) Assignee: NV BEKAERT SA, Zwevegem (BE)

( * ) Notice: Subject to any disclaimer, the term of this patent is extended or adjusted under 35 U.S.C. 154(b) by 713 days.

(21) Appl. No.: 15/125,459

(22) PCT Filed: Mar. 10, 2015

(86) PCT No.: PCT/EP2015/054920
§ 371 (c)(1),
(2) Date: Sep. 12, 2016

(87) PCT Pub. No.: WO2015/144427
PCT Pub. Date: Oct. 1, 2015

(65) Prior Publication Data
US 2017/0072501 A1    Mar. 16, 2017

(30) Foreign Application Priority Data

Mar. 26, 2014    (EP) .................................... 14161650

(51) Int. Cl.
*B23K 11/02*    (2006.01)
*B23K 11/00*    (2006.01)
(Continued)

(52) U.S. Cl.
CPC .......... *B23K 11/02* (2013.01); *B23K 11/0026* (2013.01); *D07B 1/062* (2013.01);
(Continued)

(58) Field of Classification Search
None
See application file for complete search history.

(56) References Cited

U.S. PATENT DOCUMENTS

| 3,818,173 A | 6/1974 | Zinsser et al. |
| 6,169,263 B1 | 1/2001 | Derby, Jr. |

(Continued)

FOREIGN PATENT DOCUMENTS

| CN | 101596643 A | 12/2009 |
| CN | 102328148 A | 1/2012 |

(Continued)

OTHER PUBLICATIONS

International Search Report (ISR) dated Jun. 5, 2015, for PCT/EP2015/054920.

*Primary Examiner* — Jonathan P Masinick
(74) *Attorney, Agent, or Firm* — Bacon & Thomas, PLLC

(57) ABSTRACT

A welding apparatus for a controlled welding of steel cord ends. The welding apparatus allows for a controlled welding path from welding period over post-weld period to complete cool-down. In the welding apparatus a direct current source is controlled over time using a programmable controller. By sensing the voltage over the clamps of the welding apparatus and using this as a further input to the programmable controller, a constant power dissipation between the clamps can be achieved in the post-weld period. An associated method for making the weld where during the post-welding period the electric power dissipated between the clamps is held constant. The welds obtained by this procedure have a favourable metallographic structure in that the heat affected zone has more than 50% of pearlite and/or bainite over the total area of that zone.

9 Claims, 5 Drawing Sheets

(51) Int. Cl.
 *D07B 1/06* (2006.01)
 *B23K 101/32* (2006.01)
 *B23K 103/04* (2006.01)
(52) U.S. Cl.
 CPC ........ *D07B 1/0613* (2013.01); *B23K 2101/32* (2018.08); *B23K 2103/04* (2018.08); *D07B 2501/2046* (2013.01)

(56) References Cited

U.S. PATENT DOCUMENTS

| | | | |
|---|---|---|---|
| 8,350,178 B2* | 1/2013 | Inselmann | B21C 37/124 219/100 |
| 2004/0245223 A1* | 12/2004 | Kondo | B23K 11/16 219/117.1 |
| 2013/0056524 A1 | 3/2013 | Michaut | |

FOREIGN PATENT DOCUMENTS

| | | |
|---|---|---|
| DE | 2658332 A1 | 6/1978 |
| DE | 3628246 A1 | 4/1987 |
| EP | 1484129 A1 | 12/2004 |
| GB | 688244 A | 3/1953 |
| GB | 1251928 A | 11/1971 |
| WO | 03/100164 A1 | 12/2003 |
| WO | 2007/020148 A1 | 2/2007 |
| WO | 2008/116469 A1 | 10/2008 |

\* cited by examiner

WELD BETWEEN STEEL CORD ENDS, METHOD AND APPARATUS TO IMPLEMENT SUCH WELD

The invention relates to the field of welding steel cords as used to reinforce elastomeric appliances such as tyres, hoses, conveyor belts, timing belts and the like.

BACKGROUND ART

When producing or processing steel cords at one point the cord comes to an end. There is therefore the need to connect ends of steel cords to one another to continue processing. The connection should be easy to make and have properties close or equal to that of the steel cord so the connection passes unnoticed in the process.

The current practice is to connect steel cord ends by means of welding. The ends of a steel cord are cut flush and mounted in the moveable clamps of a welding apparatus. While the ends of the steel cord are pressed against one another alternating electrical current is applied through the clamps and the cord ends heat up to the point that the steel softens and melts. The ends are pushed into one another over a set distance and as soon as this distance is reached the current is cut off. The weld cools down quickly in the ambient air. This procedure is known as 'upset welding' or 'resistance butt welding'.

Steel cords are made of fine (thinner than 0.50 mm) plain carbon steel filaments that are cold drawn to high tensile strength (higher than 3000 N/mm$^2$). Two or more filaments are twisted together into a steel cord. The metallographic structure of the filaments is a high tensile, drawn pearlitic steel structure. In the weld the strength increase due to cold forming is completely lost. Due to the high cooling rate after making the weld the metallographic structure becomes martensitic which is more brittle than the drawn pearlitic structure. In the current welding procedure it is not possible to prevent the formation of the martensitic structure as the cooling of the weld is too fast, and in any case much faster than when compared to the welding of thicker wires.

In order to alleviate the brittleness of the martensitic steel in the weld, an annealing operation—also called stress-releaving thermal process—is subsequently performed by placing the weld between two annealing clamps. By driving a small alternating current through the weld, the weld is annealed. An annealed martensitic structure has more ductility. GB1251928 describes such procedure.

As extra material is added into the weld zone, the transverse size of the weld is larger than that of the steel cord and the burr must be buffed or hammered away so that the diameter of the steel cord does not appreciably increase at the weld. In general a diameter increase of not more than 3% is allowed.

The procedure is difficult to repeat in a consistent way because:
- An AC current source is used wherein a high line voltage of 380 to 400 VAC is down converted to a low voltage, high current by means of a transformer. Fluctuations in line voltage directly influence the power emitted at the weld. These fluctuations can be significant over time depending on the quality of the electrical grid in the wire plant.
- The steel cords have an irregular surface with which it is difficult to make a consistent and repeatable electrical contact. The problem is particularly severe when welding open cord type of constructions or constructions with few filaments such as 2×1 wherein steel filaments can shift over one another and are difficult to align face-to-face in the clamps. The electrical resistance therefore can differ very much from clamp event to clamp event even on the same steel cord. When welding single wires, this problem is not an issue as the smooth surface of the wire provides a consistent and repeatable contact and the end-faces of the wire can be easily aligned.

The procedure results in a weld that has less than desirable properties: the inferior ductility of the annealed weld, the reduced strength of the weld and the presence of a weld burr make such a weld a weak spot. Welds are therefore subjected to a tensile test, a diameter check and sometimes a ductility verification. If the weld fails it has to be redone which is a loss of time.

In the existing art mostly reference is made to the welding of single wires or filaments of relatively thick gauge (more than 0.5 mm) such as wires for welded mesh.

U.S. Pat. No. 3,818,173 describes a method to weld lead patented (i.e. the wire has not been cold drawn), high carbon (more than 0.45 wt % C) steel wires end-to-end wherein first an annealed martensitic weld is made. In a following, separate step the weld is subjected to a 'homogenising step' above a critical temperature (1065° C., i.e. above austinisation temperature) for several minutes and subsequently is 'cooled under a controlled cooling rate'. It is suggested to 'direct a blast of cooling fluid on the joints so as to cool the steel rapidly to a subcritical temperature at which the carbon in the steel transforms directly to pearlite in minimal time'. During this step the temperature is measured by a pyrometer of which the temperature reading is used to control the current through the weld. The procedure comprises several steps, is therefore lengthy (takes several minutes) and is not practical as a pyrometer has to be trained on the wire itself. Also it relates to single wires and not to steel cords.

CN 102328148 describes method for welding mesh (i.e. cross-wise welding) of steel wires of low or medium carbon steel wires wherein, after the formation of the weld, a first natural cooling step is followed by a separate heating step. After a second natural cooling step a final tempering treatment is applied. The method is only applicable for cross-wise welding of single wires in a mesh. In that configuration contact resistance between clamps and wire is very well repeatable.

CN101596643A describes a method to butt weld stainless steel wires. The method describes how the temperature can be controlled by means of a DC current pulse train. Only the magnitude of current and length of pulse is controlled.

DE2658332 describes a method to flash weld filaments or strands whereby the welding clamps are provided with recesses to receive the weld globule. In flash welding an electric arc is drawn between the filament or strand ends to heat those ends up. Flash welding is not used on steel cords as the ends are too irregular to ensure a repeatable arc formation.

WO 2008/116469 describes a welding method and the accompanying welding apparatus for welding duplex steel stainless steel strips wherein the cooling of the welded interface section is controlled by means of computer programmed to apply current during at least a part of the cooling cycle.

The following art has been identified that particularly focusses on the welding of steel cords:

WO 03/100164 describes in FIG. 5, page 9 and 10 the known procedure of welding and annealing a strand in a multi strand steel cord, further comprising the step of shortening the lay length of the strand prior to welding. Only one welded strand is present at a specific spot of the multi strand cord.

WO 2007/020148 describes a connection of steel cord ends that is particularly suitable to connect open cord type of steel cords. The connection comprises a jointed section such as for example a weld and a fixation section, away from the jointed section for immobilising the filaments relative to one another.

While the latter two procedures result in acceptable welds for their specific purpose they are not universally applicable or need extra materials and work.

The inventors therefore sought to improve the existing types of welds, weld procedures and welding apparatus in the manner that will be explained hereinafter.

SUMMARY OF THE INVENTION

The primary object of the invention is to provide excellent welds that are consistently repeatable irrespective of the type of steel cord welded. More in particular the weld and the weld procedure provided are suitable for steel cords with filament diameters below 0.50 mm and comprising two or more filaments. The method and the apparatus described result in a weld that does not break in subsequent processes during steel cord production or in downstream processing of rubber reinforcement appliances. Moreover, the method and apparatus overcomes the problem of irregular electrical resistance between clamps, particularly occurring when welding open cords or cords with few filaments.

According a first aspect of the invention a weld between two ends of steel cords is claimed. The steel cords comprise a plurality of steel filaments i.e. 2 or more filaments. Generally the number of steel filaments is between 2 and below 50, but mostly lower than 27. The steel cords of which the ends are welded are preferably of equal type, although the invention is also applicable to welding different types of steel cords to one another. The steel filaments are twisted together in the manners known in the art of steel cord making.

Steel cords can be of the simple 'n×d' type wherein 'n' filaments of diameter 'd' are twisted together. For example the cord can only comprise two filaments (n=2). Such simple cord can also be made in an 'open' version wherein filaments are preformed so rubber can enter in between the filaments during further processing. Or they can be of the 'U+T' type wherein a twisted strand of 'T' filaments and a non-twisted bundle of 'U' filaments are twisted around each other. These types are particularly difficult to weld as their looseness (in the case of an open cord) or their irregular surface (for the 'U+T' type) makes it difficult to make a repeatable electrical contact.

Or the steel cords can be of the layered type such as 'n+m' wherein a core strand of 'n' filaments twisted together with a first lay length is twist covered by a layer of 'm' filaments around that core strand with a second, different lay length. The procedure can be followed by the addition of an even further layer of 'l' filaments: the 'n+m+l' type. Or the steel cords can be of the 'compact cord' type wherein a bundle of filaments of equal diameter are twisted together with the same lay. These cords are generally adapted to allow the ingress of rubber which makes their surface irregular or open, thus making the electrical contacting between cord and welding clamps difficult to make reliably.

Also multistrand steel cords of type N×M can be considered for example 7×7 wherein 7 strands each comprising 7 filaments twisted together are on their turn twisted together. These types are difficult to weld in that the outer surface available for electrical contacting the steel cord is small compared to the mass between the welding clamps that has to be welded.

Local current densities can therefore become very high leading to an irregular heating throughout the weld.

By no means the above list of steel cord types is limitative as the skilled person can readily add or specify other steel cords that fall within the scope of the invention but may be not enumerated here.

The steel filaments are made of carbon steel, more preferably plain, high carbon steel. A typical steel cord composition has a minimum carbon content of 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. There are only traces of copper, nickel and/or chromium. A typical steel tire cord composition for high-tensile steel cord has a minimum carbon content of around 0.80 weight %, e.g. 0.78-0.82 weight %.

The steel filaments are drawn i.e. have been subjected to a process of cold deformation wherein the diameter of the wire is gradually reduced by pulling them through successively smaller orifices or dies. The resulting percentage reduction in area for steel cord filaments is at least 86% and generally around 95% to 97% while currently a total reduction in area of 98.2% is possible. Drawn steel filaments have a higher tensile strength compared to the patented steel wire they are drawn from. The tensile strength of a drawn wire increases with the amount of area reduction and/or carbon content of the steel. Typically the tensile strength of filaments used for steel cord have a tensile strength above 3000 N/mm$^2$ for filaments thinner than 0.30 mm while for wires of 0.12 mm a tensile strength of 4000 N/mm$^2$ is currently achievable.

The patented steel wire before drawing has a fine pearlitic structure. After drawing the structure is still pearlitic but the grains are elongated. A skilled metallurgist can readily recognise these kinds of metallographic structures.

Typically the wires are coated with a coating that promotes adhesion between the filaments and the rubber wherein the steel cord is used.

Typically a brass or zinc coating is used to this end. Most used is brass with a composition of 63.5% copper by weight, the remainder being zinc.

Steel cord filaments have to be relatively thin to be easily bendable during their use in a tyre. The cross sectional area of individual filaments is therefore below 0.2 mm$^2$ which corresponds—for a wire with round cross section—to a diameter of 0.5 mm. Generally the cross sectional area is lower such as below 0.1 mm$^2$ (e.g. 0.30 mm) or below 0.05 mm$^2$ (e.g. 0.25 mm diameter). The lowest cross sections of filaments wherein still steel cords are available is 0.005 mm$^2$.

The diameter or cross sectional area of the steel filaments and the number of filaments in the steel cord are particularly important in that they largely influence the cooling behaviour of the weld when cooled or heated as will be explained in the description of the welding method.

The weld according the invention is characterised by a favourable metallographic structure. When a metallographic cross section of the weld according the invention is made, about 50% of the area of the heat affected zone of the weld has a pearlite and/or bainite metallographic structure. In a preferred embodiment the pearlite and/or bainite metallographic structure extends over 60%, possibly over 70% of the heat affected zone. In a further preferred embodiment at least 50% of the area of the heat affected zone shows a pearlitic metallographic structure.

In a cross section, the 'heat affected zone' can be easily identified as it is that zone of the weld between the drawn, anisotropic structure of the unaffected steel filaments.

The 'pearlite' metallographic structure of carbon steel in the weld can be easily determined in a metallographic polished and etched cross section. Contrary to the drawn pearlite in the steel filament, the pearlite in the heat affected zone shows grain boundaries and is isotropic. It has a mother-of-pearl, hence the name, aspect due to the alternate layers of ferrite and cementite. It is formed—under the right conditions of cooling from the austenite phase—at around 550° C. to 700° C. It is strong yet tough and corresponds to the structure of the patented wire the steel filament is drawn from.

The 'bainite' metallographic structure is equally well known by steel metallurgists. It forms at somewhat lower temperatures (400° C. to 550° C.) than pearlite and is characterised by the presence of sheaves of ferrite plates, separated by retained austenite, martensite or cementite.

The tensile strength of pearlite and/or bainetic phases is above 1000 N/mm$^2$ for steels with at least 0.55 wt % carbon. These phases show a better ductility than the tempered martensite phase.

Another feature of the weld is that at the transition of the weld to the unaffected filaments in the steel cord ends, untempered martensite can be observed. However, by proper selection of the cooling conditions, this untempered martensite can be made thinner than 600 μm, or even thinner than 400 μm or even below 100 μm. Ideally, the untempered martensite is barely observable.

The above defined weld is obtained by the method as described hereinafter.

According this second aspect of the invention a method for making a weld between steel cord ends is presented. The steel cords comprise a plurality (two or more) of filaments of drawn pearlitic carbon steel with a cross sectional area of less than 0.2 mm$^2$. The method starts by providing two steel cord ends that are cut flush. With 'cut flush' is meant that none of the filaments of either end protrudes more than the other filaments: the filaments end substantially in the same plane.

The steel cord ends are mounted in the axially movable welding clamps of a welding apparatus, more preferably a welding apparatus according the third aspect of the invention.

The welding clamps push the steel cord ends against one another with a controlled welding force. As the steel cord ends then make an electrical contact an electrical current can be fed through the point of contact. The electrical current is a direct electrical current i.e. does not change polarity. The direct current is of a level, the welding current level, that the steel of the filaments melts (the carbon steels of interest for this application melt above 1400° C.). As the steel softens, a globule of molten steel forms coalescing the steel filament ends into a single spheroid while the mounting clamps move towards one another.

Upon reaching a prescribed clamp travel, the direct current is uninterruptedly lowered from the welding current level to a controlled post-welding direct current for a prescribed post welding time interval. After that prescribed period the post welding current is switched off and the obtained weld is allowed to cool down.

Characteristic about the method is now that the post-welding current is controlled such that the electric power dissipated between the clamps is steered towards a constant level during the post welding period. The electric power dissipated is the product of the voltage over the clamps multiplied by the current through the clamps. Important to note is that this power is independent of the electrical resistance between the clamps. The constant level is reached after a certain transition time. After that time the constant level is held.

The electrical resistance between the clamps is the sum of the contact resistance $R_L$ between the left clamp and the steel cord, the resistance of the weld itself $R_w$ and the resistance $R_R$ between the steel cord and the right clamp. The resistance of the weld $R_w$ will depend on how the filaments exactly match in the weld. This may vary from weld to weld due to the irregular orientation of the filament ends facing one another prior to welding. The welding clamp resistances $R_L$ and $R_R$ also vary from clamp event to clamp event depending how exactly the individual filaments are arranged in the clamps as the filaments rearrange themselves in the clamps.

When now the post welding current '$I_{pw}$' is supplied in a constant current mode the power dissipated becomes:

$$P = I_{pw}^2 \cdot (R_L + R_w + R_R)$$

This power depends on the clamp contact resistances and weld resistance that may vary from clamp event to clamp event, even on the same cord. This introduces variability on the post weld power injected.

By now sensing the voltage 'U' over the clamp, the post welding current is steered such that the product of voltage and current remains constant:

$$P = U \cdot I_{pw}$$

The variability of the clamp contact resistances and weld resistance has disappeared and every weld is now made with exactly the same post welding power.

The post welding power is set to hold the weld at a temperature between 300° C. to 700° C., preferably between 400 to 650° C. or most preferred between 500° C. to 600° C. for a time sufficient to induce the metallographic transformations in the weld globule. The power needed to keep the weld at a certain temperature decreases with decreasing diameter and decreasing number of filaments as these determine the mass of the weld globule. Depending on the type of construction (more specifically the number of filaments) and the diameter of the filaments in the steel cord this power may vary between 5 watt (for few and/or fine filaments) to 100 watt (for many and/or thicker filaments).

Minute absolute changes in contact resistance and/or weld resistance lead to high relative differences in power dissipated when working with constant post-welding currents. The inventive method completely eliminates this variability. Hence, the level of power control becomes very important when welding steel cords with fine filaments. Most of the heat is lost through heat conduction to the welding clamps, while the loss of heat to the ambient air or by radiation does not influence this needed power to an appreciable level.

The power needed can be selected in the following way:
When the post welding power is too low, the weld will cool to a too low temperature (below 300° C.) and the molten steel globule will condense in a martensitic structure.
When the post welding power is too high, the weld remains above 700° C. and after the post welding power is switched off, again a martensitic structure forms resulting in a brittle weld.

The post-welding current is steered towards the constant power level during a post-welding time interval for between 5 to 50 seconds depending again on the type of construction. When the post-welding time interval is below 5 seconds, the weld is martensitic as the transformation to pearlite and/or bainite has not completed. When the post welding time interval is higher than 50 seconds, untempered martensite grains tend to form also inside the weld. Typically post welding times will be between 5 to 30 seconds.

An important aspect of the method is that the switching or transition of the direct current from a welding current level to the post-welding current level goes without interruption. The slightest interruption would lead to formation of a martensitic phase that later must be annealed. This is important because the mass in the welding globule is so small that all heat is lost to the clamps within milliseconds.

After welding the weld burr is removed—if necessary—by hammering or by rubbing with emery paper as is ordinary in the field.

In a further preferred embodiment of the method, the transition time from the welding current level to the controlled post welding current can be set. In the metallography of steel, not only the temperature levels are of importance, but also the speed of cooling. As the mass of the weld globule is very small (in the order of milligram) cooling of the globule takes place with cooling rates in excess of 1000 K/s.

The cooling rate increases with decreasing filament diameter. Hence, when welding fine steel wires as in a steel cord according the invention, it is important to cool the weld in a controlled manner by regulating the heating power fed to the weld in post welding as the cooling wins over the heating. There, the controlled transition time becomes important. For welding of thick wires, the situation is reversed: in order to obtain a fast enough cooling after welding the current is completely switched off and a forced cooling is even applied as the heat drain through the clamps does not suffice to cool the weld fast enough.

In order not to go too fast to the controlled power level corresponding to a post welding temperature, the transition time or time constant from going to welding current level to the post welding current level are preferably controllable to between 10 to 1000 ms. Times shorter than 10 ms are not needed as the cooling time is anyhow slower than that. More than 1000 ms makes the welding too time consuming. This transition time has an influence on the width of the untempered martensitic phase in the weld: too fast changeover results in untempered martensite at the border between weld clamp and the weld itself. As the weld clamp acts as a heat sink the cooling is fastest there.

Possibly, one may consider an additional annealing step if the untempered martensitic region would still be present. The annealing step is preferably performed without having to remove the weld from the welding clamps.

According a third aspect of the invention, a resistance butt welding apparatus is claimed. It comprises welding clamps that are relatively moveable to one another along a common axis, a controllable current source for feeding current to the clamps, and a programmable controller.

Differing from currently known welders for steel cord is that the controllable current source is a direct current source. 'Direct current' is, for the purpose of this application, a current that does not reverse direction twice within a period shorter than 15 ms. Alternatively the direct current has no mayor frequency components between 45 and 65 Hz. Moreover, this direct current output can be controlled in time by the programmable controller. In this way current levels in different time intervals and/or ramp-up or ramp-down times, i.e. transition times, can be set at will for a better control of the weld as described in the method aspect of the invention.

The welding apparatus further has voltage sensor that senses the voltage between the clamps and wherein the sensed voltage is an input to the programmable controller.

In a further preferred embodiment, the voltage sensor allows to control the product of the sensed voltage and current—i.e. the power—fed to the weld. This product can, over programmable time intervals, be steered to a set level. Steering is done by adjusting the current, while sensing the voltage.

A further advantageous feature of the welding apparatus is that the sensing mode can be switched within a very short time between:
 A controlled current output mode wherein the controller steers the emitted current according a pre-programmed current-time profile or;
 A controlled voltage mode wherein the controller steers the voltage sensed according a pre-programmed voltage-time profile or;
 A controlled output power mode wherein the controller steers the power emitted according a pre-programmed power vs time profile and wherein the power is the voltage sensed multiplied by the current emitted.

The welding apparatus can be turned from one mode of operation to any other of the operation modes within 10 ms. For example during welding, the welding current will follow a pre-programmed trace, but once the welding clamps have reached their prescribed travel, the apparatus will switch to a controlled output power mode between the clamps.

As a further advantageous feature of the welding apparatus, the transition time such as for example the time constant in case of an exponential curve or the ramp-up or ramp-down time in case of a linear curve to switch from one current, voltage or power level to another current, voltage or power level can be controlled between 10 ms and 1000 ms.

DETAILED DESCRIPTION OF THE INVENTION

Figure 1:
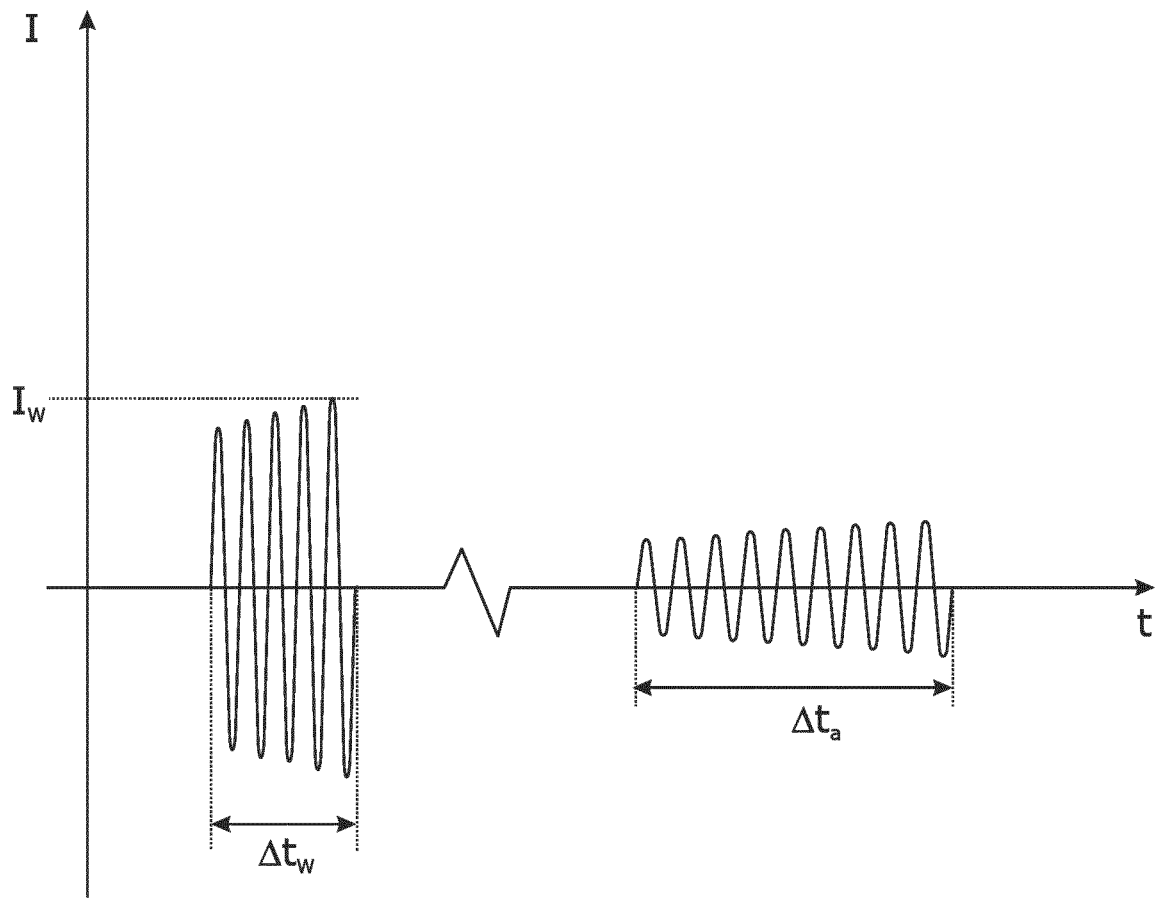
FIG. 1 describes a prior-art welding procedure.

FIG. 1 described the welding cycle according the known procedure. In that procedure the steel cord ends are cut flush and mounted between the movable welding clamps. The welding clamps slightly press the steel cord ends against one another. Upon supplying an AC current, the contact area starts to melt and a molten steel globule forms. The steel cord ends are pressed into one another and if the clamps reach a closed position, the current is cut-off automatically after a welding time $\Delta t_w$. The globule condenses into an untempered martensitic structure. As this structure is strong but very brittle, it must be tempered. Therefore the fresh weld is removed from the welding clamps and placed between two annealing clamps. The AC current of the annealing clamps is limited such that the globule does not heat up too much. When making welds with the above procedure on a 5×0.22 Betru® open steel cord of Bekaert only 7 out of 10 welds pass the tensile test of 40% times the minimum breaking load of the cord (630 N).

Figure 6:
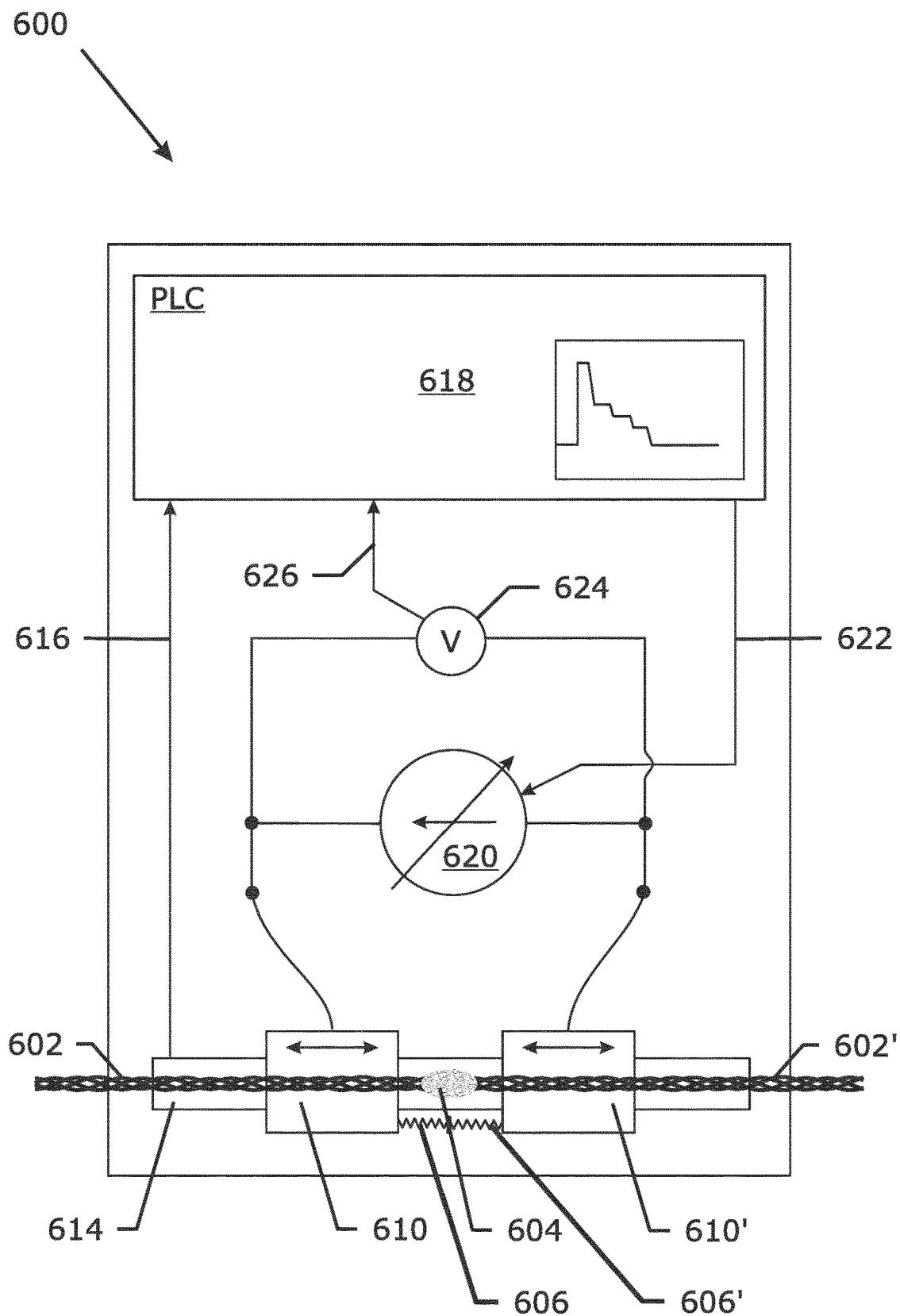
FIG. 6 is a schematic representation of the welding apparatus according the third aspect of the invention.

FIG. 6 shows a schematic overview of the resistance butt welding apparatus 600 according the third aspect of the invention. It comprises welding clamps 610, 610' mounted on a common rail 614 that also includes a position encoder such as an inductive proximity sensor or a laser distance sensor or similar position sensor to detect the distance between the clamps 610, 610' along the rail 614. The welding clamps 610, 610' are pushed towards one another by a spring powered system 606, 606' or similar means such as e.g. by a pneumatic piston, by weight or by magnetic force.

The welding apparatus 600 further comprises a controllable DC current source 620 that can deliver up to 300 A. The apparatus further comprises a Programmable Logic Controller (PLC) 618 to steer the welding process. The PLC 618 allows the free design of particular current supply profiles 'I(t)' to the clamps by the steering of the controllable current source 620. For example it allows to go from one current level to another current level within adaptable time constraints.

The PLC is fed with two inputs: there is the input of the clamp travel 616 that signals to the PLC when the weld clamps have sufficiently approached one another during welding thereby signalling the end of the welding step. Concurrently, through voltage metre 624, the voltage 'U(t)' sensed across the clamps 610, 610' is followed over time and fed to the PLC unit 618 through input 626. As the PLC knows the output current I(t) and the input voltage U(t) the multiplication of both results in the power 'P' emitted between the clamps (P=U·I). The power P can be steered to a specified value over prescribed time intervals as programmed in the PLC. The power is steered through variation of the current via controllable current source 620.

Hence, the welding apparatus allows switching over from a controlled current output mode to a controlled power output mode. Important is that the changeover of control regime is fast and the switching time is within 10 ms. This can be obtained by selecting an appropriate current source and PLC clock cycle. Also a controlled voltage sensed mode is possible wherein the voltage sensed over the weld is controlled to a certain level by steering the current over the weld.

In a further improved version of the welding apparatus the transition time needed to go from one current level to another current level within the controlled current output mode can be controlled between 10 and 1000 milliseconds (ms). Alternatively, within the controlled power output mode the transition time needed to switch from one power level to another level can be steered within between 10 to 1000 ms. Less used is the controlled voltage sensed mode, but also there the same transition times can be reached. Changeover from one level of current to another level of current or from one level of power to another level of power can be programmed along a linear curve with time. More preferred is if the changeover follows an exponential decay or growth curve as this is in line with the natural decay curves of the apparatus.

The post welding power $P_{pw}$ value (in watt) is dependent on the type of steel cord construction and is mostly dependent on number of filaments and diameters. It must be established in a series of preliminary trials, but once known the PLC can be programmed to the optimal value for each steel cord construction.

Figure 2A:
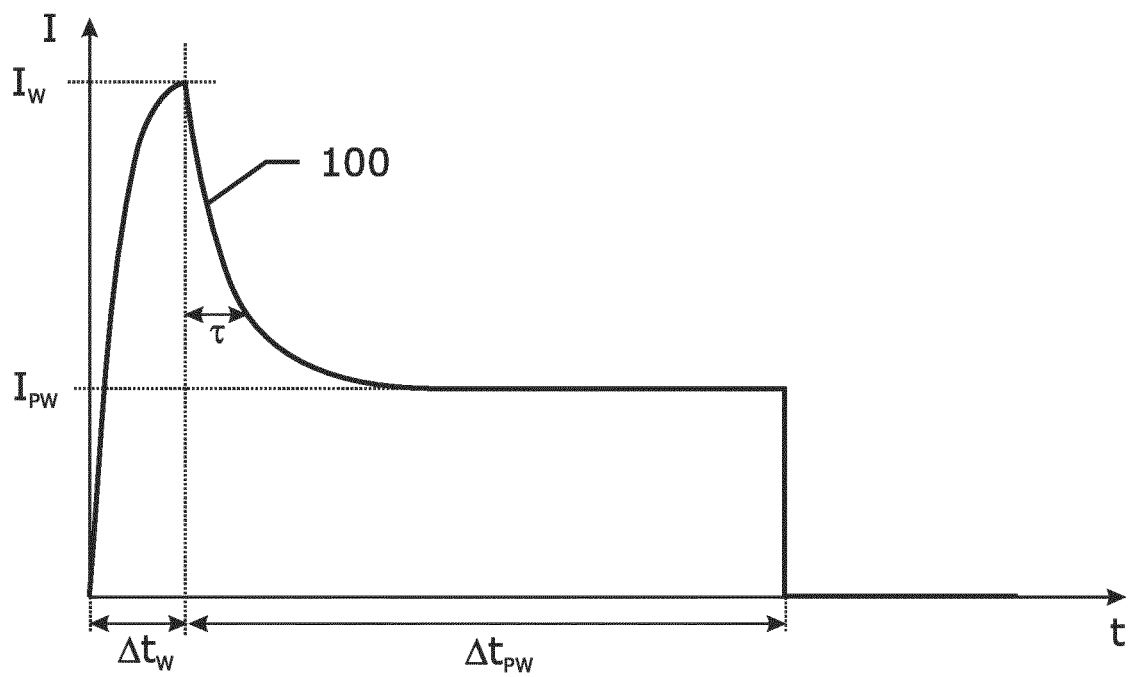
FIG. 2a and FIG. 2b depict the time dependencies of current (2a) and power (2b) according a first embodiment of the method: in controlled current mode.

In FIG. 2a a practical current profile 100 for welding according the invention is presented. The profile comprises an exponential growth curve to the weld current level '$I_w$' for a welding time interval $\Delta t_w$, immediately followed by a decay to a post welding current level '$I_{pw}$'. The post welding current level $I_{pw}$ is held for a pre-programmed time interval $\Delta t_{pw}$. The changeover from weld current level to post-welding current level is triggered by the position sensor 616 of the welding apparatus. If the clamps are sufficiently close to one another this is an indication that the molten steel globule has formed. Contrary to the established practise, the post-welding occurs immediately after the weld phase and the weld is not allowed to cool down. It is only after the post-welding phase, the weld is cooled down to ambient temperature. Then also the weld burr is removed by hammering or rubbing with emery paper (if needed).

In the post-welding regime the current through the weld levels off to a post-welding direct current level $I_{pw}$. The changeover is complete within a transition time of 3·τ, wherein 'τ' is the exponential decay constant of the current i.e. the time needed to decay to 1/e or to 37% of the difference between weld and post-weld current. The transition time 3·τ can be adjusted between 10 to 1000 ms.

During experiments with this set-up the inventors found that some of the welds appeared to glow dark red while other welds did not glow although the current profile supplied remained unaltered and the construction was exactly the same. The welds that glowed dark red later appeared to be more brittle than then non-glowing welds. The inventors attribute this to, without being bound by this theory whatsoever, the variable weld resistance and variable contact resistance between the welding clamps and the steel cord.

Figure 4:
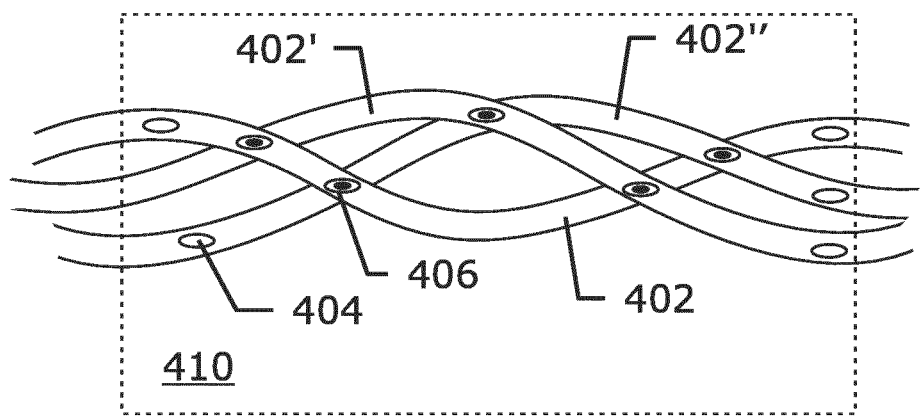
FIG. 4 illustrates the 'clamp resistance' problem.

Indeed, as illustrated in FIG. 4, the contact area of a clamp 410 with the filaments 402, 402', 402" of a steel cord is depending on the position of the different filaments. As the filaments are twisted around each other the internal electrical contact points 406 (the filled ellipses) between the steel filaments and the contact points from steel filaments to the clamps 404 (the empty ellipses) occur erratically from contacting event to contacting event. Hence the clamp resistances $R_L$ and $R_R$ differ from clamp event to clamp event. Next to that there is also variation on how the filaments of the steel cord contact each other during welding, leading to a variation in weld resistance as this contact happens in a non-repeatable manner.

Figure 2B:
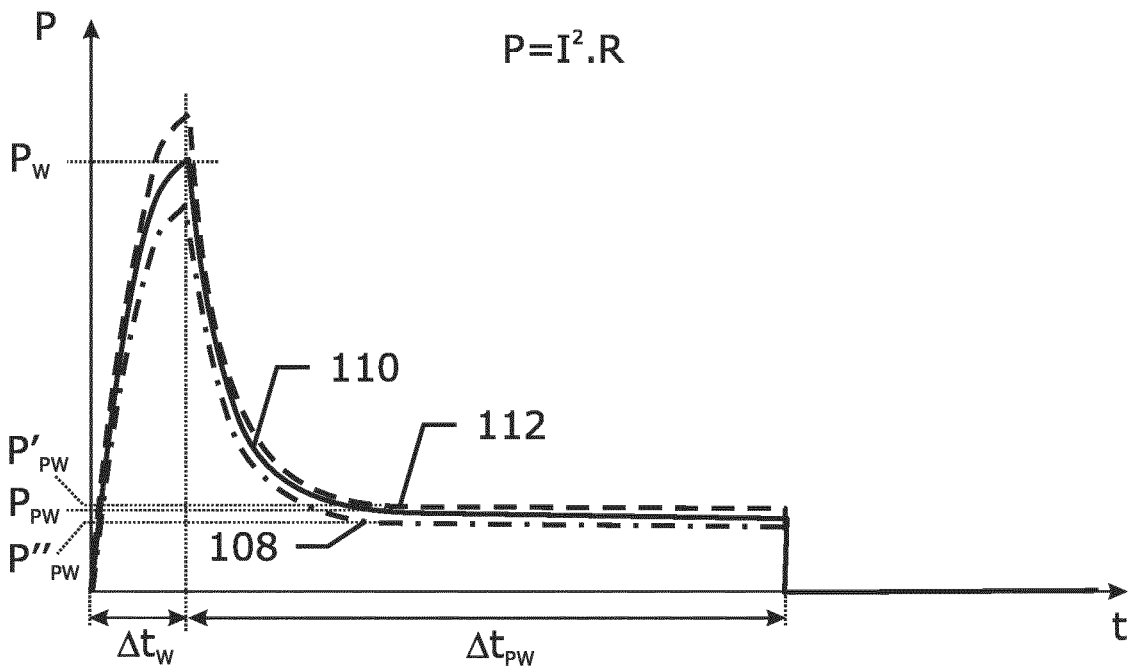

As a result the power supplied in between the clamps will also vary as is depicted in FIG. 2b. There the power supplied $P=I^2 \cdot R$ is shown for a total resistance $R=R_L+R_w+R_R$. A decrease in resistance to 90% of R (good electrical contact) leads to the lower curve 108 while an increase in resistance to 110% of R (bad electrical contact) leads to increase of power supplied (112) over the complete welding cycle.

To aggravate things further: it is a rule of thumb in physics that a good electrical contact is also a good heat conducting contact and vice versa. The increased power that is supplied to the weld and converted into heat when a high electrical resistance is present can also not escape from the weld. As a consequence the weld heats up even more than expected.

While this is not so much a problem during the weld time interval $\Delta t_w$, as the purpose is to bring the steel above its melting temperature and preferably somewhat higher, it has a profound influence on the metallography of the weld in the post-welding regime. The too high contact resistance may therefore lift the temperature of the weld in the post-welding regime well above the desirable temperature range of between 300 to 700° C. Conversely, a too low contact resistance may lead to too low temperatures. Both situations will lead to the formation of untempered martensitic phases or even uncontrolled, mixed phases that should not occur in a good weld.

Figure 3A:
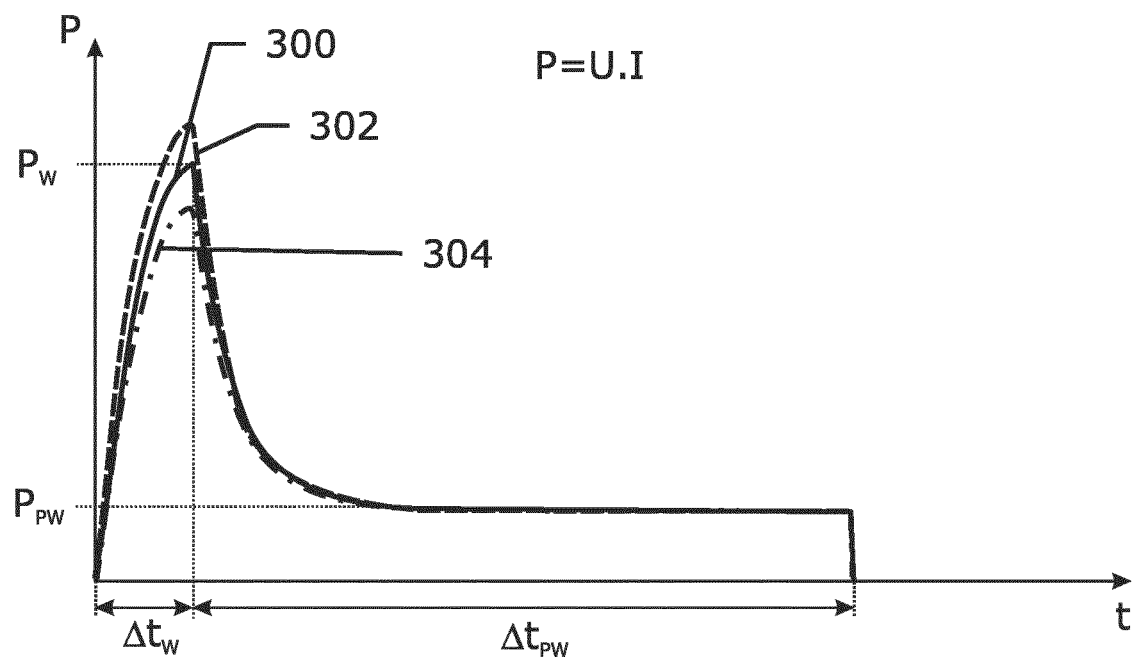
FIG. 3a and FIG. 3b depict the time dependencies of power (3a) and current (3b) according a second embodiment of the method wherein the post-weld power level is controlled.
Figure 3B:
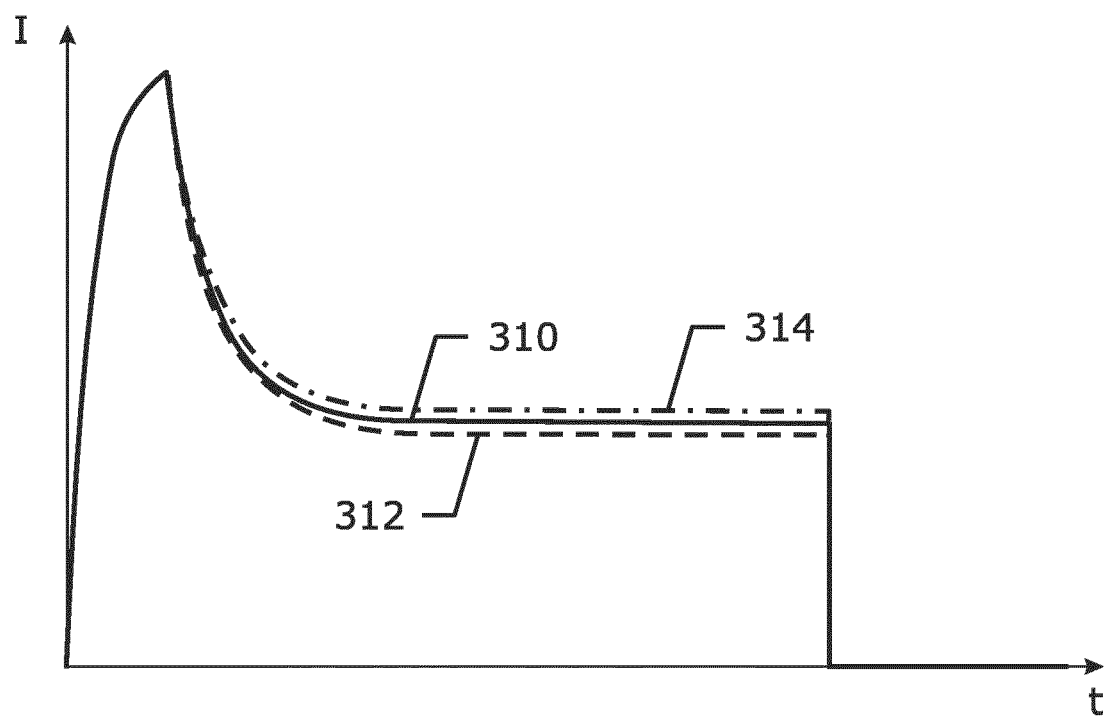

In order to overcome this unfavourable situation, the welding apparatus according the invention was adapted to switch to a constant power mode once the weld has been established. This is illustrated in FIG. 3a where the electrical power dissipated between the clamps is shown and the electrical current that goes with it in FIG. 3b. During welding, i.e. during time interval $\Delta t_w$, the PLC is programmed in a constant current mode. Hence the power dissipated during welding will vary with the total resistance between the clamps as illustrated by lines 302 and 304 of FIG. 3a. The line 302 corresponds to an increase to 1.1×R of resistance while curve 304 corresponds to a decrease to 0.9×R in resistance. Curve 300 is the power trace obtained with resistance R. To put things in perspective: R is about 25 mΩ for a 5×0.22 Betru® open cord. FIG. 3b illustrates that in the post-welding regime, the current may fall to different levels in order to obtain the same power output. Here curve 314 corresponds to the low level resistance (0.9×R), while curve 312 corresponds to the high level resistance (1.1×R). As during the welding phase, the current is controlled, the three curves coalesce there.

As the power supplied between the welding clamps is identical from weld to weld (i.e. from clamping event to clamping event) during the post-welding phase the temperature is better controlled. As a result the metallurgy is better under control and favoured perlitic and/or bainitic phases form in the weld during the post welding. This was clear also during testing where 10 welds were made of a 5×0.22 Betru® cord and all 10 passed without problems the welding test.

Figure 5A:
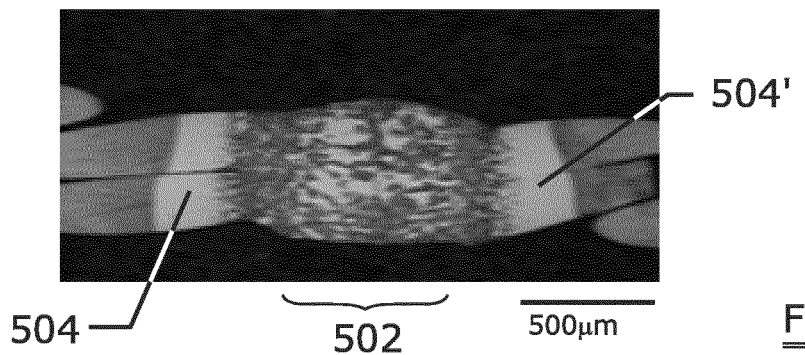
FIG. 5a and FIG. 5b show a macroscopic and a microscopic view of the weld with the different metallographic features.
Figure 5B:
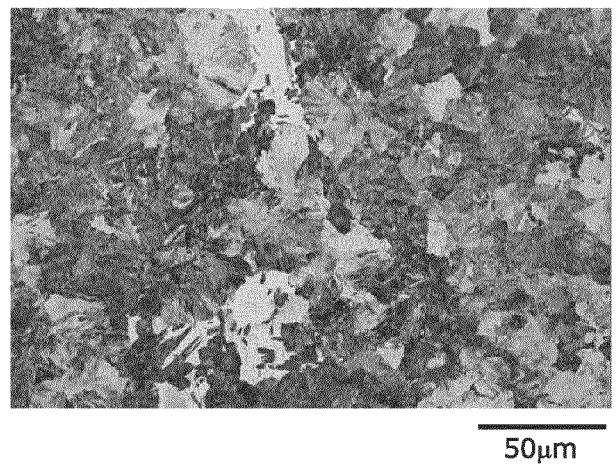

This is further illustrated in FIGS. 5a and 5b wherein the metallurgy of a favoured weld is shown. The weld was obtained on a 5×0.22 Betru® cord, with a welding current of 110 A that remained for about 122 ms (clamp travel determined). The post-welding power was set to 13 W. The post-welding current decay time (3·τ) or transition time was set to 130 ms i.e. after 130 ms the power was stable. The post welding time interval was set to 8000 ms.

FIG. 5a shows the weld in its entirety. Untempered martensitic zones 504, 504' are still present but they are less than 300 μm wide. In the middle zone 502 a mixed phase of pearlite and bainite is present that occupies 53% of the total heat affected zone. The mixed phase of pearlite and beanite is exemplified in FIG. 5b.

The invention claimed is:

1. A weld between two ends of steel cords, said steel cords comprising a plurality of filaments of drawn pearlitic carbon steel, each of said filaments having a cross sectional area of less than 0.2 mm$^2$, wherein a metallographic cross section of the heat affected zone of said weld comprises pearlite and bainite metallographic structures in an amount that the area fraction occupied by pearlite and bainite is more than 50% of the total heat affected zone area.

2. The weld of claim 1, wherein said metallographic cross section of the heat affected zone of said weld further comprises untempered martensite metallographic structures at the transition from said weld to said filaments.

3. The weld according to claim 2, wherein said untempered martensite metallographic structure at the transition from said weld to said filaments is thinner than 600 μm.

4. A method for making a weld between steel cord ends, said steel cords comprising a plurality of filaments of drawn, pearlitic carbon steel, each of said filaments having a cross sectional area of less than 0.2 mm$^2$ comprising the following steps:
   providing two steel cord ends that are cut flush;
   mounting said steel cord ends axially aligned in the axially movable welding clamps of a welding apparatus;
   controlled pressing said steel cord ends against one another while feeding a direct current at a welding current level to said clamps thereby forming a molten steel globule;
   at reaching a prescribed clamp travel lowering said direct current to a controlled post-welding direct current that is controlled for a prescribed post welding time interval;
   cooling of the obtained weld after switching of said post-welding direct current,
   wherein said post-welding current is controlled such that the electric power dissipated between the clamps is steered towards a constant power level during said post welding time interval.

5. The method according to claim 4, wherein the transition of said direct current from said welding current level to said controlled post-welding current is without interruption.

6. The method according to claim 5, wherein said transition of the direct current from the welding current level to said controlled post-welding current is controlled within a transition time of between 10 to 1000 milliseconds.

7. The method according to claim 4, wherein said post-welding current is such that the power dissipated is between 5 and 100 watt for a period of between 5 to 50 seconds.

8. The method according to claim 4, further followed by the separate step of annealing said weld with a controlled annealing power set to a prescribed power level for a prescribed period of time.

9. The method of claim 8, wherein said weld is not removed from said axially moveable welding clamps prior to and during said annealing step.

* * * * *